United States Patent [19]

Brunelle

[11] 4,330,664

[45] May 18, 1982

[54] POLYCARBONATE TRANSESTERIFICATION WITH CATALYST CONTAINING ALUMINUM HYDRIDE OR BOROHYDRIDE GROUP

[75] Inventor: Daniel J. Brunelle, Scotia, N.Y.

[73] Assignee: General Electric Company, Schenectady, N.Y.

[21] Appl. No.: 258,124

[22] Filed: Apr. 27, 1981

Related U.S. Application Data

[63] Continuation-in-part of Ser. No. 106,856, Dec. 26, 1979, abandoned.

[51] Int. Cl.$^3$ .............................................. C08G 63/62
[52] U.S. Cl. .................................. 528/198; 528/196; 528/200; 528/199
[58] Field of Search ....................... 528/200, 198, 199

[56] References Cited

U.S. PATENT DOCUMENTS 3,153,008  10/1964  Fox ...................................... 528/196

FOREIGN PATENT DOCUMENTS 1079822  8/1967  United Kingdom .

*Primary Examiner*—Harold D. Anderson
*Attorney, Agent, or Firm*—Joseph T. Cohen; James C. Davis, Jr.

[57] ABSTRACT

An improved aromatic polycarbonate transesterification process comprising reacting a bis(aryl)carbonate and a dihydric phenol in the presence of a transesterification catalyst, the improvement wherein the catalyst contains an aluminum hydride or borohydride group.

11 Claims, No Drawings

POLYCARBONATE TRANSESTERIFICATION WITH CATALYST CONTAINING ALUMINUM HYDRIDE OR BOROHYDRIDE GROUP

CROSS REFERENCE TO RELATED APPLICATIONS

This application is a continuation-in-part of Ser. No. 106,856, Dec. 26, 1979, abandoned.

This invention is related to U.S. patent applications Ser. Nos. 134,349, 143,804, and 106,855 now abandoned all of Daniel Joseph Brunelle. The above applications are assigned to the assignee of this invention. The disclosure of Ser. No. 106,885 is incorporated herein in its entirety by reference.

BACKGROUND OF THE INVENTION

1. Field of the Invention

This invention relates to an improved aromatic polycarbonate transesterification process comprising reacting a bis(aryl)carbonate and a dihydric phenol, in the presence of a transesterification catalyst, the improvement wherein the catalyst contains an aluminum hydride or borohydride group.

In general, prior art including The Encyclopedia of Polymer Science, Vol. 10 (1969), Chemistry and Physics of Polycarbonates, Polymer Reviews, H. Schnell, Vol. 9, John Wiley and Sons, Inc. (1964), among other publications, reports that transesterification of aromatic dihydroxy compounds with carbonic acid aromatic diesters can be carried out in the presence of basic catalysts in the formation of high molecular weight polycarbonates.

DESCRIPTION OF THE INVENTION

This invention embodies an improved aromatic polycarbonate transesterification process comprising reacting a bis(aryl)carbonate and a dihydric phenol in the presence of a transesterification catalyst, the improvement wherein the catalyst contains an aluminum hydride or borohydride group.

The "bis(aryl)carbonates" also commonly referred to as carbonic acid aromatic diesters are well-known and include illustratively those described by Fox's Formula III in U.S. Pat. No. 3,153,008, column 2, lines 23–72 and column 3, lines 1–42. Presently preferred bis(aryl)carbonates include diphenyl carbonate, dicresyl carbonate, bis(2-chlorophenyl)carbonate, the bis-phenyl carbonates of hydroquinone, resorcinol, and 4,4'-dihydroxydiphenyl, the bis-phenyl carbonates of the bis(4-hydroxyaryl)alkanes, -cycloalkanes, ethers, sulfides, sulfones, etc.

The "dihydric phenols" also commonly referred to as aromatic dihydroxy compounds are also well-known and include illustratively, those described by Fox's Formula II in U.S. Pat. No. 3,153,008, column 2, lines 23–72 and column 3, lines 1–42. Presently preferred dihydric phenols are of the formula:

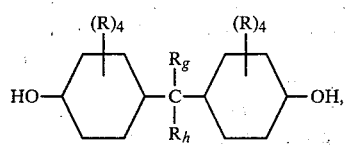

where R is selected from hydrogen, $C_{1-4}$ alkyl, methoxy, bromine and chlorine, $R_g$ and $R_h$ are hydrogen or a $C_{1-30}$ monovalent hydrocarbon group. Specific examples follow:

4,4'-dihydroxy-diphenyl-1,1-butane;
4,4'-dihydroxy-diphenyl-2-chlorophenyl methane;
4,4'-dihydroxy-diphenyl-2,2-propane also known as bis(4-hydroxyphenyl)propane-2,2.
4,4'-dihydroxy-3-methoxy-diphenyl-2,2-propane;
4,4'-dihydroxy-3-isopropyl-diphenyl-2,2-propane;
4,4'-dihydroxy-diphenyl-2,2-nonane;
4,4'-dihydroxy-2,2',3,3',5,5',6,6'-octamethyl-diphenyl methane;
4,4'-dihydroxy-2,2'-dimethyl-5,5'-di-tert-butyl-diphenyl methane
4,4'-dihydroxy-3,3'-5,5'-tetrachloro-diphenyl-2,2-propane; and
4,4'-dihydroxy-3,3',5,5'-tetrabromo-diphenyl-2,2-propane.

The "hydrides of aluminum or boron" which comprise the effective catalyst species are defined herein and in the claims as any hydride of either aluminum or boron which has at least one hydrogen atom directly bonded to either an aluminum or a boron atom. Illustratively, borohydrides included in the above definition are hydrides of boron which have the following general structure

where M is selected from the class consisting of an alkali metal, an alkaline earth metal, a quaternary hydrocarbon ammonium, a quaternary hydrocarbon phosphonium and a tertiary hydrocarbon sulfonium group, n is a number of from 1 to 4, and R is a hydrocarbon or hydrocarbonoxy group.

Also illustratively, quaternary ammonium, quaternary phosphonium, and tertiary sulfonium groups have the following general structures, respectively,

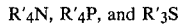

wherein R' is a hydrocarbon group, e.g., alkyl, aryl, cycloalkyl, etc. including mixtures thereof.

In a presently preferred embodiment, the catalyst is a quaternary alkyl ammonium tetrahydridoborate having the formula:

where R' is a $C_{1-4}$ alkyl group, i.e., an alkyl group which contains 1 to 4 carbon atoms. Even more preferred is tetramethylammonium tetrahydridoborate—also commonly referred to as tetramethylammonium borohydride.

Illustratively, aluminum hydrides included in the above definition are hydrides which have the following general structure:

wherein M, n and R are the same as described above with respect to the borohydride formula.

In another embodiment of this invention, a presently preferred aluminum hydride catalyst is an alkali metal tetrahydridoaluminate having the formula

wherein M is selected from lithium and sodium. Even more preferred is lithium tetrahydridoaluminate—also commonly referred to as lithium aluminum hydride.

The general glass of inorganic or organic compounds which contain aluminum hydride or boron hydride groups are known to those skilled in the art and can be prepared by any method including methods referred to in the following publication "Hydrogen Compounds of Metallic Elements", General and Industrial Chemistry Series, K. M. Mackay, E. & F. N. Spon, Ltd., publisher (1966) Great Britain.

In general, effective mole ratios of metal hydride to the dihydric phenol are within the range of from $1 \times 10^{-6}$ to 1 to 1:1, preferably from $1 \times 10^{-4}$ to 1 to about 0.02 to 1, and more preferably from $1 \times 10^{-3}$ to 1 to 0.01 to 0.1.

Optimum reaction reaction parameters include (1) temperatures of from 80° C. to 300° C., preferably 100° C. to 230° C. (2) inert atmospheres, and/or (3) reduced pressures. Illustratively, optionally a transesterification process sequence comprises initial reaction under equilibration conditions—where substantially no monohydric phenol is removed from the reaction medium—at elevated temperatures up to about 200°–250° C. in an inert nitrogen atmosphere, with subsequent initial and substantially continuous removal of monohydric phenol at increasing temperatures up to about 250°–300° C., or higher and decreasing pressures down to 1 to 0.1 mm Hg.

A series of bisphenol-A, e.g. bis(4-hydroxyphenyl)-propane-2,2 polycarbonates were transesterified by reacting 1.10 mole equivalents of bis(4-hydroxyphenyl)-propane-2,2 (i.e. BPA) with 1.00 mole equivalents diphenylcarbonate in the presence of the mole equivalents of catalyst candidates noted in Table II, using a Kugelrohr evaporator. The process temperature-pressure sequence is described in Table I. The metal hydride type as well as the properties of the resulting polycarbonates are described in Table II.

TABLE I

BPA-Polycarbonate Reaction Parameter and Sequence

| Total Reaction Time/hr. | Time Interval/ hr. at following: | Temp. °C. | and Pressure Hg. |
|---|---|---|---|
| 1.5 | 1.5 | 100–150° | 30 mm |
| 2.0 | 0.5 | 150–200° | 1 mm |
| 3.5 | 1.5 | 200° | 1 mm |
| 4.0 | 0.5 | 210–260° | 1 mm |

TABLE II

| Example No. | Catalyst Candidate (mole %)[1] | Yield[2] | Color[3] | $MW_w$[4] | IV[5] |
|---|---|---|---|---|---|
| 1 | LiAlH$_4$ (1%) | 100 | colorless | 11,000 | .172 |
| 2 | LiAlH$_4$ (.05%/Et$_2$O) | 71 | colorless | 8,500 | n.d.[6] |
| 3 | NaBH$_4$ (1%) | 93 | white | 8,400 | n.d. |
| 4 | NaBH$_4$ (.05%/H$_2$O) | 98 | hazy white | 7,500 | n.d. |
| 5 | NaBH$_4$ (.005%/H$_2$O) | 94 | colorless | 8,500 | n.d. |
| 6 | LiBH$_4$ (1%) | 100 | colorless | 8,000 | n.d. |
| 7 | LiBH$_4$ (.05%/H$_2$O) | 100 | colorless | 11,400 | n.d. |
| 8 | LiBH$_4$ (.01%/H$_2$O) | 39 | colorless | 3,900 | n.d. |
| 9 | Me$_4$NBH$_4$ (1%) | 97 | colorless | 8,500 | n.d. |
| 10 | Me$_4$NBH$_4$ (.05%) | 96 | colorless | 6,300 | n.d. |
| 11 | n-Bu$_4$NBH$_4$ (.01%) | 93 | colorless | 5,300 | n.d. |
| 12 | NaAlH$_2$(OCH$_2$CH$_2$OCH$_3$)$_2$ (0.01%) | 98 | colorless | 5,500 | n.d. |
| 13 | LiAlH(OC$_4$H$_9$)$_3$ | 96 | colorless | 5,400 | n.d. |

[1]All catalysts were added as a dry powder except as noted.
[2]Yield based on bisphenol-A polycarbonate recovered after precipitation from methanol after drying at 100° C. under 20 mm Hg for 24–48 hours.
[3]The color of the product was recorded at the end of the reaction while still retained in the reactor evaporator.
[4]GPC wt. avg. MW, rel to polystyrene.
[5]IV measured in CHCl$_3$ at 25° C.
[6]n.d. = not determined.

Attempted transesterification reactions were performed using other catalyst species—not within the scope of this invention—under conditions analogous to those set out in Table I. The results are summarized in Table III.

TABLE III

| Ex. No. | Catalyst Candidate (mole %) | Yield[2] | Color[3] | $MW_w$[4] | IV[5] |
|---|---|---|---|---|---|
| 14 | none | 0 | — | — | — |
| 15 | LiOH (10$^{-3}$%) | 0 | — | — | — |
| 16 | NaH (1%) | 73 | lt. yellow | 3,500 | n.d.[6] |
| 17 | LiH (1%) | 60 | pale yellow | 4,900 | .113 |
| 18 | LiF (1%) | 70 | colorless | 4,500 | .109 |
| 19 | LiCl (1%) | 92 | pale yellow | 9,200 | n.d. |
| 20 | AlH$_3$ (1%) | 78 | purple | 7,900 | n.d. |
| 21 | Li$_2$CO$_3$ (1%) | 89 | colorless | 8,300 | n.d. |
| 22 | ZnO (1%) | 0 | — | — | — |
| 23 | TaH (1%) | 0 | — | — | — |
| 24 | BH$_3$ . 2,6-lutidine (1%) | 45 | colorless | 4,400 | n.d. |
| 25 | BH$_3$ . NMe$_3$ (1%) | 40 | colorless | 8,900 | n.d. |
| 26 | NbH (1%) | 0 | — | — | n.d. |

Footnotes[1-6] same as Table II footnotes.

As illustrated, the aluminum hydride and boronhydride catalyst species of Table II generally provide high molecular weight polycarbonates that are essentially colorless in generally good yields. The polycarbonate, if any, resulting from the use of other catalyst candidates—described in Table III—illustrate that these catalyst candidates are either ineffective or less efficient as transesterification catalysts when compared with the metal hydride catalysts of this invention.

The aromatic polycarbonates derived from this process, preferably, exhibit an intrinsic viscosity of at least 0.3, and more preferably from about 0.5 to about 1.5 or even higher, deciliters per gram (dl./g.) as measured in either methylene chloride or chloroform or similar solvent systems at 25° C. Especially useful polycarbonates generally have intrinsic viscosities within the range of from about 0.38 to about 0.7 dl./g. The polycarbonates generally have a number-average molecular weight of at least about 1000, preferably 5000, and more preferably from about 10,000 to about 50,000 or higher. Polycarbonates of such molecular weight characteristics process easily between about 450° F. and 650° F., and are generally suitable raw materials for the manufacture of filaments, fibers, films, sheets, laminates, and other thermoplastic articles of manufacture including reinforced articles employing conventional molding, extruding, etc., manufacturing techniques.

What I claim as new and desire to secure by Letters Patent of the United States is:

1. In a process of preparing a high molecular weight polycarbonate by reacting at least one bis(aryl)carbonate with at least one dihydric phenol in the presence of a transesterification catalyst, the improvement wherein the catalyst is (1) a borohydride having the general formula:

$$MBH_nR_{4-n}$$

wherein M is selected from the class consisting of an alkali metal, an alkaline earth metal, a quaternary hydrocarbon ammonium, a quaternary hydrocarbon phosphonium and a tertiary hydrocarbon sulfonium group, n is a number of from 1 to 4, and R is a hydrocarbon or hydrocarbonoxy group, or (2) an aluminum hydride having the general formula:

$$MAlH_nR_{4-n}$$

wherein M, n and R are the same as described above.

2. The claim 1 process wherein the borohydride has the structural formula $$[R'_4N]BH_nR_{4-n}$$

wherein each R' is an alkyl group containing from 1 to 4 carbon atoms, and n is a number of from 1 to 4.

3. The claim 2 process wherein each R' is an n-butyl group.

4. The claim 1 process wherein n is 4.
5. The claim 1 process wherein n is 3.
6. The claim 1 process wherein the n is 2.
7. The claim 1 process wherein the n is 1.

8. In a process of preparing a high molecular weight polycarbonate by reacting bis(4-hydroxyphenyl)-propane-2,2 with diphenyl carbonate in the presence of a transesterification catalyst, the improvement wherein the catalyst is quaternary n-butyl ammonium borohydride having the formula $$(C_4H_9)_4NBH_4.$$

9. In a process of preparing a high molecular weight polycarbonate by reacting bis(4-hydroxyphenyl)-propane-2,2 with diphenyl carbonate in the presence of a transesterification catalyst, the improvement wherein the catalyst is lithium aluminum hydride having the structural formula $$LiAlH_4.$$

10. In a process of preparing a high molecular weight polycarbonate by reacting bis(4-hydroxyphenyl)-propane-2,2 with diphenyl carbonate in the presence of a transesterification catalyst, the improvement wherein the catalyst is sodium borohydride having the structural formula $$NaBH_4.$$

11. In a process of preparing a high molecular weight polycarbonate by reacting bis(4-hydroxyphenyl)-propane-2,2 with diphenyl carbonate in the presence of a transesterification catalyst, the improvement wherein the catalyst is quaternary methyl ammonium borohydride having the structural formula $$(CH_3)_4NBH_4.$$

* * * * *